3,405,097
POLYMERIC COMPOSITIONS OF MATTER

Robert M. Lusskin, Neenah, Wis., Frank Backer, Albany, N.Y., and John R. Larson, Upper Saddle River, N.J., assignors to Universal Oil Products Company, Des Plaines, Ill., a corporation of Delaware
No Drawing. Continuation-in-part of application Ser. No. 311,620, Sept. 26, 1963. This application Feb. 13, 1967, Ser. No. 615,347
5 Claims. (Cl. 260—75)

ABSTRACT OF THE DISCLOSURE

The polymers comprise the reaction product of a polyurethane which contains a reactive isocyanate and group with a halo-substituted polyhydromethanonaphthalenedicarboxylic acid or anhydride thereof. The thus formed polymers possess desirable characteristics such as fire retardance and color stability.

Specification

This application is a continuation-in-part of our copending application Ser. No. 311,620 filed Sept. 26, 1963, now abandoned.

This invention relates to polymeric compositions of matter and particularly to polymeric compositions of matter containing, as one component thereof, a polyhalopolyhydromethanonaphthalenedicarboxylic acid or anhydride thereof.

The polymeric compositions of matter which are prepared according to the process of this invention in a manner hereinafter set forth in greater detail will possess many particular and desirable physical properties which make these particular compounds desirable and commercially attractive. For example, the polymers which may be prepared by treating a prepolymer with a polyhalopolyhydromethanonaphthalenedicarboxylic acid or anhydride thereof will possess fire retardant properties superior, in many instances, to other polymeric compositions of matter now in use. This property will be found to be of special advantage when preparing plastic materials to be utilized in places subject to excessive heat or possible flames, such uses including architectural panelling for construction work, ash trays, wall plugs for electrical connections, etc. In addition, the finished polymeric composition of matter when utilized to prepare polyurethane foams will possess a high degree of fire resistance and therefore may be used for insulation where the aforementioned fire resistance is of primary concern. Furthermore by utilizing a polyhalopolyhydromethanonaphthalenedicarboxylic acid or anhydride thereof as a constituent in the finished polymer, said produce will be resistant, to a large extent, to discoloration as compared with polymeric products which have been prepared utilizing other chlorinated cyclic derivatives. The acid or anhydride, due to its stability and resistance to deterioration, will thus make it an attractive constituent of plastic materials or polymers which are colorless and should remain so, or which are colored and will not darken, lighten or turn another color.

The color stability of products derived from polyhalopolyhydroalkanonaphthalenedicarboxylic acids and anhydrides thereof compared with similar compounds not containing the cyclohexane ring would not be expected based on current theoretical reasoning. Because alkylated cyclohexanes are known to undergo autoxidation readily, it might be predicted that polyhalopolyhydroalkanonaphthalenedicarboxylic acids and anhydrides thereof would be rapidly attacked by atmospheric oxygen and susceptible to free radical reactions catalyzed by light. Such attack should lead initially to hydroperoxide formation at the various ring junctions as well as at the positions alpha- to the carboxyl groups. Decomposition of the hydroperoxides would lead to formation of alcohols, ketones, olefins, ring opening and further attack on the susceptible methylene carbon atoms. The products of these reactions, which might be aromatic compounds, quinones and condensed materials, would liberate hydrogen chloride and form highly colored products. The reason that these processes fail to occur with polyhalopolyhydroalkanonaphthalenedicarboxylic acids and anhydrides thereof has not been proven at this time. The term "prepolymer" as used hereinafter in the present specification and appended claims will refer to compositions of matter, comprising the reaction product of polymerizable monomers, containing reactive functional substituents which will react with the polyhalopolyhydromethanonaphthalenedicarboxylic acid or anhydride thereof in a chemical manner to thus prepare the finished and desired composition of matter.

It is therefore an object of this invention to provide novel compositions of matter which possess desirable properties of flame retardancy and high color stability.

Another object of this invention is to provide novel compositions of matter by reacting certain prepolymeric compounds with a polyhalopolyhydromethanonaphthalenedicarboxylic acid or anhydride thereof to prepare compounds possessing valuable physical properties.

In one aspect, an embodiment of this invention is found in a composition of matter comprising the reaction product formed at a temperature in the range of from about 25° C. to about 300° C. of a polyurethane with a compound selected from the group consisting of polyhalopolyhydromethanonaphthalenedicarboxylic acids and anhydrides thereof.

A specific embodiment of this invention resides in a composition of matter comprising the reaction product formed at a temperature in the range of from about 25° C. to about 300° C. of a polyurethane which is formed by reacting a polyester with 2,4-tolylene diisocyanate and 5,6,7,8,9,9-hexachloro - 1,2,3,4,4a,5,8,8a - octahydro - 5,8-methano-2,3-naphthalenedicarboxylic anhydride.

Other objects and embodiments will be found in the following further detailed description of this invention.

As hereinbefore set forth, it has now been discovered that polyhalopolyhydromethanonaphthalenedicarboxylic acids or anhydrides thereof of the type hereinafter set forth in greater detail, may be reacted with prepolymeric compositions of matter to form finished polymers which will possess desired physical properties. Examples of prepolymers which will contain at least one reactive functional group, said reactive functional group being capable of reacting with a polyhalopolyhydromethanonaphthalenedicarboxylic acid or anhydride thereof to form the desired product, will include polymers generically referred to as epoxy resins, urethanes, polyamides, polyamines, polyols and polyesters. The particular polyhalopolyhydromethanonaphthalenedicarboxylic acid or anhydride thereof will act to a certain extent as a curing agent or cross-linking agent and thus enable the finished product to possess the desired physical characteristics and stability to possible deterioration, a particular example of this being a superior stability against discoloration due to deterioration of the particular polymeric product as compared to other products utilizing chlorinated compounds which add fire retardance to the finished product, but not color stability. By utilizing a polyhalopolyhydromethanonaphthalenedicarboxylic acid or anhydride thereof of the type hereinafter set forth in greater detail, the finished product, as hereinbefore set forth, will possess a relatively high resistance to discoloration due to the structural configuration of the acid or anhydride which is used as the curing agent or cross-linking agent.

The polyhalopolyhydromethanonaphthalenedicarboxylic acid or anhydride thereof which comprises one ingredient of the finished product may be prepared in any suitable manner, one method being the two step process which comprises first effecting a Diels-Alder reaction of a conjugated aliphatic diene with an olefinic dicarboxylic acid. Examples of conjugated aliphatic dienes which may be used include 1,3-butadiene (hereinafter referred to as butadiene), 2-methyl-1,3-butadiene (isoprene), 1,3-pentadiene (piperylene), 1,3-hexadiene, etc. Olefinic dicarboxylic acids which may be used include maleic acid, fumaric acid, itaconic acid, etc. It is contemplated within the scope of this invention that the term "olefinic dicarboxylic acids" may also include their intramolecular dehydration products such as, for example, maleic anhydride, etc. The Diels-Alder condensation between the conjugated aliphatic diene and the unsaturated dicarboxylic acid will take place at an elevated temperature in the range of from about 80° to about 250° C. or more and at a pressure sufficient to maintain a major portion of the reactants in a liquid phase, said pressure being in a range of from atmospheric to about 100 atmospheres or more.

The tetrahydrophthalic acid, anhydride or homologue thereof which result from the aforementioned condensation is then further condensed with a conjugated halocycloalkadiene to form the desired product. Examples of halo-substituted cycloalkadienes which may be used include chloro-substituted 1,3-cyclopentadienes (hereinafter referred to as cyclopentadiene) such as tetrachlorocyclopentadiene, pentadichlorocyclopentadiene, hexachlorocyclopentadiene, etc. Other cycloalkadienes containing halogen substituents which may be used include pentabromocyclopentadiene, hexabromocyclopentadiene, etc. The second condensation reaction is also the Diels-Alder type and may be effected at elevated temperature in the range of from about 50° to about 250° C. and at atmospheric or superatmospheric pressures ranging up to about 100 atmospheres or more, the pressure being such as to maintain a major portion of the reactants in the liquid phase at the reaction temperature. If so desired, both Diels-Alder condensations may be effected in the presence of an inert organic solvent, including aromatic solvents such as benzene, toluene, o-xylene, m-xylene, p-xylene, etc.; saturated paraffins and cycloparaffins such as pentane, hexene, heptane, cyclopentane, methylcyclopentane, etc.

Examples of polyhalopolyhydromethanonaphthalenedicarboxylic acids or anhydrides thereof which may be prepared include 5,6,7,8,9,9-hexachloro-1,2,3,4,4a,5,8,8a-octahydro-5,8-methano-2,3-naphthalenedicarboxylic acid, 5,6,7,8,9,9-hexachloro-1,2,3,4,4a,5,8,8a-octahydro-5,8-methano - 2,3 - naphthalenedicarboxylic anhydride, 5,6,7,8,9,9-hexabromo-1,2,3,4,4a,5,8,8a-octahydro-5,8-methano - 2,3-naphthalenedicarboxylic acid, 5,6,7,8,9,9-hexabromo-1,2,3,4,4a,5,8,8a - octahydro - 5,8 - methano - 2,3 - naphthalenedicarboxylic anhydride, etc.

As hereinbefore set forth, the aforementioned polyhalopolyhydromethanonaphthalenedicarboxylic acids or anhydrides thereof are reacted with certain polymeric compositions of matter containing at least one reactive functional group. An example of these polymeric products comprises epoxy resins which may be cured by the addition of the polyhalopolyhydromethanonaphthalenedicarboxylic anhydride. The resins in an uncured state are thermoplastic and may range from low viscosity liquids to high melting point brittle solids. Examples of epoxy resins include the condensation product of epichlorhydrin and bis-phenol, epoxidized oils, olefins, etc. The aforementioned anhydride will react with the epoxy resin by condensing with the reactive epoxy or oxirane group present in the molecule to form a cross-linked tridimensional structure. By utilizing the particular polyhalopolyhydromethanonaphthalenedicarboxylic anhydride, the resultant product will be stable in regard to color, said stability being of particular advantage when utilizing the resins for certain specific purposes, such as floor surfacing, coatings, etc.

Another polymeric product which may be reacted with the acid or anhydride of the type hereinbefore set forth comprises the polyurethanes which are prepared from prepolymers in which the reactive functional group is an isocyanate end group. The particular prepolymer which is to be treated with the acid or anhydride will be prepared by reacting a polyester which contains reactive —OH groups (said polyester having been prepared by reacting polyols such as ethylene glycol, propylene glycol, etc., with acids such as adipic acid) with an excess of the isocyante. Examples of isocyanates and particularly aromatic polyisocyanates which may be used include 2,4-tolylene diisocyanate, 2,6-tolylene diisocyanate; or mixtures thereof, 2,4-benzene diisocyanate, 2,6-benzene diisocyanate, or mixtures thereof, diphenylmethane-4,4'-diisocyanate, 3,3'-bitolylene-4,4'-diisocyanate, 4,4'-methylenedi-(o-tolyl isocyanate), p,p-diphenylmethane diisocyanate, various polymeric isocyanates containing 3, 4, 5 or more phenyl isocyanate groups per mole of the polymeric isocyanates such as triphenylmethane triisocyanate, polymethylene polyphenylisocyanate, dianisidine diisocyanate, hexamethylene diisocyanate, etc. The resulting prepolymer will be a linear low molecular weight product or a high molecular weight product depending upon the particular form of the finished product. The aforementioned prepolymer is then cured by reaction with a polyhalopolyhydromethanonaphthalenedicarboxylic acid or anhydride thereof to form the desired product. The curing of the prepolymer by the addition of the acid or anhydride will result in the cross-linking or chain-extension of the polymer to give products which possess higher molecular weights than the prepolymer. In addition, if so desired, the compounds may be prepared in the form of a foam by incorporating therein a foaming agent or blowing agent which will provide a reactant capable of reacting with the diisocyanate to form carbon dioxide which is a particularly suitable gas for foaming. While water is the preferred foam-inducing agent it is also contemplated that other foaming agents may be utilized such as, for example, trichlorofluoromethane or other fluorocarbons, various diazo- or nitrozo- group-containing compounds of low molecular weight hydrocarbons such as methane, ethane, propane, butane, pentane, typical azo- or nitrozo-group-containing compounds being: azodicarbonamid, N, N' - dinitrozo - N,N' - dimethylterephthalamid, etc., the selection of the particular foaming agent will depend upon certain reaction conditions and whether or not a high density or low density or rigid or flexible foam constitutes the desired product. For example, if a dense foam is desired, a relatively small amount of the foaming agent will be used, inasmuch as a correspondingly small amount of gas will be liberated. Conversely speaking, if a light foam is used, a relatively large amount of the foaming agent will be employed so that a maximum amount of the gas will be liberated and trapped in the material. The final product in either foam or other form, after curing thereof, will then possess the desired physical properties of the type hereinbefore set forth, that is, a high density as regards color changes due to deterioration. In addition, to being used as a foam, the urethanes may be used as coatings, said coatings having desirable characteristics as compared to other urethanes which have been prepared utilizing other chlorinated cyclic compounds, such characteristics including being fast drying, possessing a hard surface, a deep gloss, a high resistance to abrasion and weathering as well as an excellent resistance to fire. When utilizing these urethanes as coatings of this type, it is necessary in many instances that the coatings also have a high resistance to changes in color especially when being exposed to climatic conditions of sun, heat, cold, etc. By utilizing a polyhalopolyhydromethanonaphthalenedicarboxylic acid or anhydride of the type set forth in the present invention, the coating will possess fire retardancy as well as the necessary physical characteristics and retain the desired color for a longer period of time than will urethane coatings which do not contain this particular acid or anhydride but contain other chlorinated cyclic derivatives.

Yet another example of prepolymers containing an excess of at least one reactive functional group which may be reacted with the polyhalopolyhydromethanonaphthalenedicarboxylic acid or anhydride comprises polyamides. These polyamides may be prepared by condensing a polyamine with a dibasic acid. Examples of these polyamides would be the condensation of an amine containing more than two functional groups such as diethylenetriamine, dipropylenetriamine, etc. or with a molar excess of a diamine such as ethylenediamine propylenediamine etc., with a dibasic acid such as adipic acid, sebacic acid, etc. to form a prepolymer, said prepolymer containing a reactive functional amine group which may then be cross-linked with a polyhalopolyhydromethanonaphthalenedicarboxylic acid or anhydride thereof. This cross-linking may be done at temperatures ranging from about 200° up to about 300° C. or more. The resulting cured or cross-linked polyamide may then be used for molding resins, films, coatings, insulation, etc. the finished product again exhibiting the desired physical properties of being flame resistant and also being resistant to color changes due to the stability of the polyhalopolyhydromethanonaphthalenedicarboxylic acid or anhydride thereof which is utilized in the preparation as contrasted to other polyamine compounds which contain chlorinated cyclic derivatives.

Another prepolymer which may be cured or cross-linked by the use of the aforementioned acid or anhydride thereof are polyesters which have been formed by the reaction of a dibasic acid, unsaturated in nature, such as maleic acid with a molar excess of a glycol, or with a polyhydroxy compound which contains more than two —OH groups such as a hexanetriol. The resulting polyester may then be cross-linked utilizing a polyhalopolyhydromethanonaphthalenedicarboxylic acid or anhydride thereof to form the desired products. For example polyester resins may be cross-linked with an acid or anhydride of this type to form alkyds which will possess both flame-retardant and color stable properties. In addition to their use as coatings, the cross-linked polyesters may be used for molding and casting polymers which also possess the aforementioned desired physical characteristics.

The prepolymers of the type hereinbefore set forth which contain an excess of at least one reactive functional group, and the polyhalopolyhydromethanonaphthalenedicarboxylic acid or anhydride thereof may be reacted in any manner known in the art, the reaction conditions such as temperature and pressure being dependent upon the particular compounds undergoing curing or cross-linking. Usually the curing or cross-linking of the prepolymer with the particular acid or anhydride thereof will be effected at temperatures ranging from room temperature (about 25° C.) up to about 300° C. or more. In addition, the acid or anhydride thereof will be present in the finished reaction product in various concentrations, ranging from about 5% to about 50% or more of the finished product, the particular concentration again being dependent upon the particular use to which the finished polymeric product will be put.

The following examples are given to illustrate the process of the present invention which, however, are not intended to limit the generally broad scope of the present invention in strict accordance therewith.

Example I

An epoxy resin is prepared by condensing epichlorhydrin and bis-phenol. The resin is liquid at room temperature and is cured by placing the resin and an equimolecular amount of 5,6,7,8,9,9-hexachloro-1,2,3,4,4a,5,8, 8a - octahydro-5,8-methano-2,3,-naphthalenedicarboxylic anhydric in an apparatus provided with heating means. The mixture is slowly heated and poured into a glass mold where it is cured at a temperature of about 150° C. for approximately 6 hours.

The cured epoxy resin has a hardness as measured by a Shore Durometer of about 82. The resin is subjected to the direct action of a flame and shows an excellent flame retardancy by not burning when removed from the direct action of the flame, said cured resin being self-extinguishing. In addition, the cured resin possesses excellent color stability when it is compared to another epoxy resin which is cured by treatment with a curing agent comprising a chlorinated cyclic compound which does not contain the specific structure of the compounds of the present invention, particularly the absence of a cyclohexane ring.

Example II

In this example, a polyester is prepared by reacting 146 g. (1.0 mole) of adipic acid, and 106 g. (1.0 mole) of diethylene glycol with heating for a predetermined period of time at a temperature of about 150° C. The mixture is then cured by reaction with 443 g. (1.0 mole) of 5,6,7, 8,9,9-hexachloro-1,2,3,4,4a,5,8,8a-octahydro - 5,8 - methano-2,3-naphthalenedicarboxylic acid to form the desired product. This product possesses excellent color stability, said product retaining the original color for a relatively long period of time as compared to other polyesters which are prepared utilizing other chlorinated cyclic compounds, as well as exhibiting excellent fire retardant properties.

Example III

In this example, a prepolymer is prepared by condensing 103 g. (1.0 mole) of diethylenetriamine with 146 g. (1.0 mole) of adipic acid. The prepolymer is then cured by reacting said prepolymer with 425 g. (1.0 mole) of 5,6,7,8,9,9-hexachloro-1,2,3,4,4a,5,8,8a - octahydro-5, 8-methano-2,3-naphthalenedicarboxylic anhydride to form a polymer which, as in the case in the polymers formed in the above examples, possesses an excellent color stability and flame retardancy as contrasted to other polymers of similar type which are prepared by using other chlorinated cyclic compounds which possess fire retardant, but not color stability, properties.

Example IV

A prepolymer is formed by condensing 98 g. (1.0 mole) of maleic anhydride with 134 g. (1.0 mole) of 1,2,6-hexanetriol at an elevated temperature at about 150° C. to form a polyester. This polyester which comprises the prepolymer is cured or cross-linked by reacting said polyester with 425 g. (1.0 mole) of 5,6,7,8,9,9-hexachloro-1,2,3,4,4a,5,8a-octahydro - 5,8 - methano - 2,3-naphthalenedicarboxylic anhydride also at an elevated temperature to prepare a cured polyester resin which possesses excellent color stability and flame retardant properties.

Example V

In this example, a urethane prepolymer is prepared by placing 53 g. (0.5 mole) of diethylene glycol, 73 g., 0.5 mole) of adipic acid and 67 g. (0.5 mole) of 1,2,6-hexanetriol in a three-necked alkylation flask which is provided with a stirrer, a nitrogen inlet tube, a short column for water take-off and a condenser. The mixture is then placed under a nitrogen blanket and heated to a temperature in the range of from about 155° to about 175° C. for a period of about 3.5 hours, the water of condensation which forms being continually removed. At the end of this time, the product which formed is removed. Following this, the mixture is thoroughly admixed with an excess of 3 moles of 2,4-tolylene diisocyanate per mole of mixture. The mixture will become homogenous and heat will evolve. The urethane prepolymer is then cured by reaction wtih a mole equivalent of 5,6,7,8,9,9-hexachloro-1,2,3,4,4a,5,8,8a-octahydro - 5,8 - methano-2,3-naphthalenedicarboxylic acid to form the desired product. This product will possess excellent color stability, said product retaining the original color for a relatively long period of time as compared with other urethanes, as well as exhibiting excellent fire-retardant properties.

Example VI

A polyurethane foam is prepared in a manner similar to that set forth in Example V above by placing a mixture of mole equivalents of adipic acid, diethylene glycol or ethylene glycol in a three-necked alkylation flask provided with a stirrer, nitrogen inlet tube, condenser and heating means. The flask is purged with a stream of nitrogen and thereafter heated under a nitrogen blanket at a temperature of from about 150° C. to about 175° C. for a period of about 4 hours. During this time, the water of condensation which is formed during the reaction is continuously removed. The thus formed mixture is then condensed with p,p-diphenylmethane diisocyanate in a mole ratio of 2 moles of diisocyanate per mole of mixture. Upon completion of the preparation of the urethane prepolymer the prepolymer is then reacted with a mole proportion of 5,6,7,8,9,9 - hexachloro - 1,2,3,4, 4a,5,8,8a-octahydro-5,8 - methano - 2,3 - napthalenedicarboxylic anhydride along with a tertiary amine catalyst, a bubble nucleation agent comprising silicon oil and a foam agent comprsing water to form a polyurethane foam. The resultant foam will possess excellent color stability in that said product will retain the original color for a relatively long period of time when compared to other polyurethane foams whch do not contain the 5,6,7, 8,9,9 - hexachloro - 1,2,3,4,4a,5,8,8a-octahydro-5,8-methano-2,3-naphthalenedicarboxylic anhydride. In addition, the polyurethane foam will also exhibit excellent fire retardant properties.

We claim as our invention:
1. A composition of matter comprising the reaction product formed at a temperature in the range of from about 25° C. to about 300° C. of a polyurethane having an isocyanate end group with a compound selected from the group consisting of polyhalopolyhydromethano-naphthalenedicarboxylic acids and anhydrides thereof in an amount of from about 5% to about 50% by weight of the finished product, said polyurethane having been prepared by reacting a hydroxyl-containing polyester with a molar excess of an organic polyisocyanate.

2. The composition as set forth in claim 1, further characterized in that said acid comprises 5,6,7,8,9,9-hexachloro-1,2,3,4,4a,5,8,8a-octahydro-5,8-methano - 2,3-naphthalenedicarboxylic acid.

3. The composition as set forth in claim 1, further characterized in that said anhydride comprises 5,6,7,8, 9,9-hexachloro-1,2,3,4,4a,5,8,8a-octahydro - 5,8-methano-2,3-naphthalenedicarboxylic anhydride.

4. The composition as set forth in claim 1, further characterized in that said acid comprises 5,6,7,8,9,9-hexabromo-1,2,3,4,4a,5,8,8a - octahydro - 5,8 - methano - 2,3-naphthalenedicarboxylic acid.

5. The composition as set forth in claim 1, further characterized in that said anhyride comprises 5,6,7,8,9,9-hexabromo-1,2,3,4,4a,5,8,8a-octahydro-5,8-methano - 2,3-naphthalenedicarboxylic anhydride.

References Cited

UNITED STATES PATENTS

| | | | |
|---|---|---|---|
| 3,148,163 | 9/1964 | Freyermuth | 260—2.5 |
| 3,297,606 | 1/1967 | Dunkel | 260—22 |

DONALD E. CZAJA, *Primary Examiner.*

M. B. FEIN, *Assistant Examiner.*